United States Patent Office.

HARVEY SAWYER, OF WILSON, NORTH CAROLINA ASSIGNOR TO C. H. SAWYER.

Letters Patent No. 114,717, dated May 9, 1871.

IMPROVEMENT IN MEDICAL COMPOUNDS FOR CURE OF RHEUMATISM, &c.

The Schedule referred to in these Letters Patent and making part of the same.

*To all whom it may concern:*

Be it known that I, HARVEY SAWYER, of Wilson, in the county of Wilson and State of North Carolina, have invented a new and useful Improvement in Medical Compound; and I do hereby declare that the following is a full, clear, and exact description thereof, which will enable others skilled in the art to make and use the same.

This invention relates to a new and useful remedy for the cure of rheumatism, neuralgia, and other complaints, and to be applied in various ways, and consists in a compound composed of the ingredients hereinafter mentioned, in the proportion and manner substantially as specified.

In carrying out my invention and discovery I use the following ingredients as follows, viz.:

To one quart of molasses I add of nitric acid six ounces; muriatic acid, six ounces; and let the composition stand and ferment for the space of three days. I then add one-half gallon of strong solution of castile-soap, and one-half gallon of spirits of camphor and one and one-half ounce of oil of cubebs.

The above-mentioned ingredients, when combined as specified, form a liniment which is most efficacious in the cure of many diseases in both man and beast, and is a most valuable family medicine.

Having thus described my invention,

I claim as new and desire to secure by Letters Patent—

The above medical compound, substantially as described.

HARVEY SAWYER.

Witnesses:
PETER E. HINES,
J. W. BLOUNT.